United States Patent
Nevisdal

(10) Patent No.: US 10,531,647 B2
(45) Date of Patent: Jan. 14, 2020

(54) TIPPING BOW FOR AN OCEAN-GOING FARMING SYSTEM FOR FISH AND OTHER AQUATIC ORGANISMS

(71) Applicant: EVN AS, Faervik (NO)

(72) Inventor: Trond Nevisdal, Faervik (NO)

(73) Assignee: EVN AS, Faervik (NO)

( * ) Notice: Subject to any disclaimer, the term of this patent is extended or adjusted under 35 U.S.C. 154(b) by 140 days.

(21) Appl. No.: 15/767,494

(22) PCT Filed: Oct. 18, 2016

(86) PCT No.: PCT/NO2016/050206
§ 371 (c)(1),
(2) Date: Apr. 11, 2018

(87) PCT Pub. No.: WO2017/069634
PCT Pub. Date: Apr. 27, 2017

(65) Prior Publication Data
US 2018/0303074 A1 Oct. 25, 2018

(30) Foreign Application Priority Data
Oct. 18, 2015 (NO) .................................. 20151416

(51) Int. Cl.
| | | |
|---|---|---|
| *A01K 61/65* | (2017.01) | |
| *B63B 35/26* | (2006.01) | |
| *A01K 61/60* | (2017.01) | |
| *B63B 7/02* | (2006.01) | |
| *A01K 61/13* | (2017.01) | |
| *B63B 1/14* | (2006.01) | |

(52) U.S. Cl.
CPC .............. *A01K 61/65* (2017.01); *A01K 61/13* (2017.01); *A01K 61/60* (2017.01); *B63B 7/02* (2013.01); *B63B 35/26* (2013.01); *B63B 2001/145* (2013.01); *Y02A 40/826* (2018.01); *Y02A 40/828* (2018.01)

(58) Field of Classification Search
CPC ........ A01K 61/13; A01K 61/60; A01K 61/65; B63B 2001/145; B63B 35/26; B63B 7/02
USPC ........................................................ 119/223
See application file for complete search history.

(56) References Cited

U.S. PATENT DOCUMENTS

| | | | | |
|---|---|---|---|---|
| 3,119,128 A | * | 1/1964 | Edmonson | ................ B63B 7/04 |
| | | | | 114/352 |
| 4,909,186 A | * | 3/1990 | Nakamune | ............. A01K 61/60 |
| | | | | 119/223 |
| 7,267,074 B1 | | 9/2007 | Hicks | |

FOREIGN PATENT DOCUMENTS

| | | |
|---|---|---|
| CN | 206481819 | 9/2017 |
| CN | 206658846 | 11/2017 |

(Continued)

OTHER PUBLICATIONS

Norwegian Search Report, Norwegian Patent Application No. 20151416, dated Mar. 10, 2016.

(Continued)

*Primary Examiner* — Yvonne R Abbott-Lewis
(74) *Attorney, Agent, or Firm* — Andrus Intellectual Property Law, LLP

(57) ABSTRACT

A tipping bow has at least one articulated connection to a vessel behind and is connected to an anchoring. The tipping bow has a structural member attached to one or more attachment points at the bottom edge of the tipping bow. The (Continued)

anchoring is attached to an anchor attachment positioned behind and lower than the balance point of the tipping bow.

4 Claims, 6 Drawing Sheets

(56) References Cited

FOREIGN PATENT DOCUMENTS

| | | |
|---|---|---|
| FR | 2303701 | 10/1976 |
| GB | 2163331 | 2/1986 |
| GB | 2220339 | 1/1990 |
| GB | 2227634 | 8/1990 |
| JP | H02-53426 | 2/1990 |
| NO | 173971 | 11/1993 |

OTHER PUBLICATIONS

International Search Report, PCT/NO2016/050206, dated Feb. 16, 2017.
Written Opinion, PCT/NO2016/050206, dated Feb. 16, 2017.

* cited by examiner

TIPPING BOW FOR AN OCEAN-GOING FARMING SYSTEM FOR FISH AND OTHER AQUATIC ORGANISMS

CROSS-REFERENCE TO RELATED APPLICATIONS

This application is the U.S. national stage application of International Application PCT/NO2016/050206, filed Oct. 18, 2015, which international application was published on Apr. 27, 2017, as International Publication WO 2017/069634 in the English language. The International Application claims priority of Norwegian Patent Application No. 20151416, filed Oct. 18, 2015. The international application and Norwegian application are both incorporated herein by reference, in entirety.

The present invention relates to a vessel comprising at least one segment, wherein each segment may contain one or more net pens. In what follows, the vessel is called a net-pen vessel. More specifically, the invention relates to a bow for the net-pen vessel. Even more specifically, the invention relates to a bow which is hingedly attached to the net-pen vessel, so that the bow can tip up and down with wave movements. This enables the net-pen vessel to adapt to the wave motions and it is thereby less prone to damage. The net-pen vessel may be used as an acclimatization pen, a waiting pen, a delousing pen, a quarantine pen, a farming pen et cetera for fish and other aquatic organisms.

The negative consequences attaching to farming in coastal areas have been and are in sharp focus. The negative consequences are particularly connected to escape, salmon louse, spread of disease and, not least, the welfare and quality of fish.

This invention will not entirely eliminate the escape of farmed fish from net pens, but the distance from where the net-pen vessel of the invention is placed to rivers is considerable, which reduces the consequences of the escape.

As far as salmon lice are concerned, it is found that taking water from coastal areas is problematic. To limit the problem, in addition to chemical agents and medicines, taking water from deeper levels and using wrasses, such as the ballan wrasse, have been tried. An ocean-going net-pen vessel, on the other hand, will not be that much exposed to high concentrations of nutrients in the surrounding water. And with frequent draining of the sediments, of dead fish and of unused feed, the environment inside the net pen will be improved as well. It is the same way with the spreading of disease. The distance to other facilities is positive here as well. Altogether, a net-pen vessel according to the invention promotes the welfare, quality and productivity of the fish.

In addition, licensing regulations put restrictions on how many facilities may be built along the coast. Ocean-going farming facilities will thus both remedy the negative consequences and increase the possibility of increasing the production volume within our territorial waters.

The invention relates to a segmented vessel consisting of a self-supporting, floating framework, which functions both as a walkway and a foundation for both net pens and superstructures, and a forward bow segment. The fore segment functions as a bow with a high windshield which will also provide protection against waves.

The bow segment has a structural member below the waterline, to which an anchoring is attached by means of an anchor attachment. The anchor attachment may be adjustable up along a front part of the structural member. The structural member may consist of three rods that meet at a lower point.

The fact that the anchor attachment for the anchoring/mooring is located behind and lower than the balance point of the structure induces a tipping motion because of the torque (force times length of lever arm) that this represents. This tipping motion brings the front part of the bow to lift when the forces of the waves are large or the structure is moving up a wave. The fact that the torque force ceases when the crest of the wave has been passed brings about a lowering of the front part of the bow when the structure is moving down a wave. This, in turn, makes the vessel to which the structure/bow part is articulatedly connected be spared more than with structures known so far when the wave forces are large or when the vessel is moving up a wave. The fact that the anchoring/mooring is attached behind and lower than the balance point of the structure, makes it necessary for it to be connected to at least one segment in order to orient up against the forces of the waves. Without one or more segments behind it, the wave forces will automatically turn the structure the wrong way round, and it will completely lose its seaworthiness.

The bow segment may have a skirt which is larger than the windshield. The skirt may have a passive adjustable propelling function which increases in higher waves.

The vessel is anchored to the seabed and is swinging at anchor. Such a vessel may be used as an acclimatization pen, a waiting pen, a delousing pen, a quarantine pen, a farming pen et cetera for fish and other aquatic organisms.

In one embodiment, the invention relates to a self-buoyant set of segments, maybe in a frame structure, constructed of metal or composite and may sectionally be filled with a floating means.

In a first aspect, the invention relates to a tipping bow which includes at least one articulated connection to a vessel behind, and which is connected to an anchoring, the tipping bow having a structural member which is attached, to one or more points of attachment, at the bottom edge of the tipping bow, the anchoring being attached to an anchor attachment positioned behind and lower than the balance point of the tipping bow, and the anchor attachment being attached to the structural member.

The tipping bow may further include a front oblique rod in the structural member between a front attachment point in the front under the tipping bow and a junction in the structural member at the back, and the anchor attachment is displaceable along the front oblique rod.

The tipping bow may be provided with a hull, wherein the hull is formed as a skirt, and wherein the skirt slopes forwards.

In a second aspect, the invention relates to the use of a tipping bow as described in the foregoing, as part of a vessel, the vessel being used for an acclimatization pen, a waiting pen, a delousing pen, a quarantine pen and a farming pen for fish and other aquatic organisms, or as storage space or a living section for a crew.

In what follows, an example of a preferred embodiment is described, which is illustrated in the accompanying drawings, in which:

FIG. 1 shows a net-pen vessel viewed from above;
FIG. 2 shows the net-pen vessel viewed from the side;
FIG. 3 shows a forward bow segment on a larger scale;
FIG. 4 shows an embodiment of a towing hook at the front part of the frame of the bow segment;
FIG. 5 shows an embodiment of a joint between the frames; and
FIG. 6 shows, in one embodiment, a cross section of a rectangular design of the framework.

The drawings are meant as principle drawings. The complete vessel may deviate somewhat therefrom.

FIG. 1 shows a net-pen vessel viewed from above. The number of segments may vary as required, but, here, five segments are shown, including a forward bow segment 18.

Under the bow segment 18, there is a structural member to which the anchoring is attached. In this example, the structural member consists of three rods that are attached to the framework of the bow segment at three points; two attachment points at the rear edge 1 of the bow segment 18 and one front attachment point 2.

Here, the control room 3 is outlined in the front of the bow segment 18.

The framework is shown here as solid lines, and the broken lines indicate the slope at the bottom of the net-pen bags down towards the draining locks.

FIG. 2 shows the net-pen vessel viewed from the side. The depth and the shape of the net-pen bags 9 may vary, depending on the waters in which the net-pen vessel is going to lie. Indications of both a windshield 7 at the top edge of the frame in the bow segment and the skirt 6 at the bottom edge, with which the bow segment 18 may be provided, are seen here. A front oblique rod N in the structural member can be seen well here. The oblique rod N is joined at its lower portion to the two other rods at a junction 5. Together they form the structural member, to which the anchoring 8 is connected. An anchor attachment is displaceable along the front oblique rod N to enable adjustment of the tipping of the bow segment 18 in high sea, and thereby also the passive propulsion. In this figure, the structural member has been made very deep/long to make it easier to explain the connection between strain on the anchoring 8 and the front part of the bow lifting.

Figure 6:
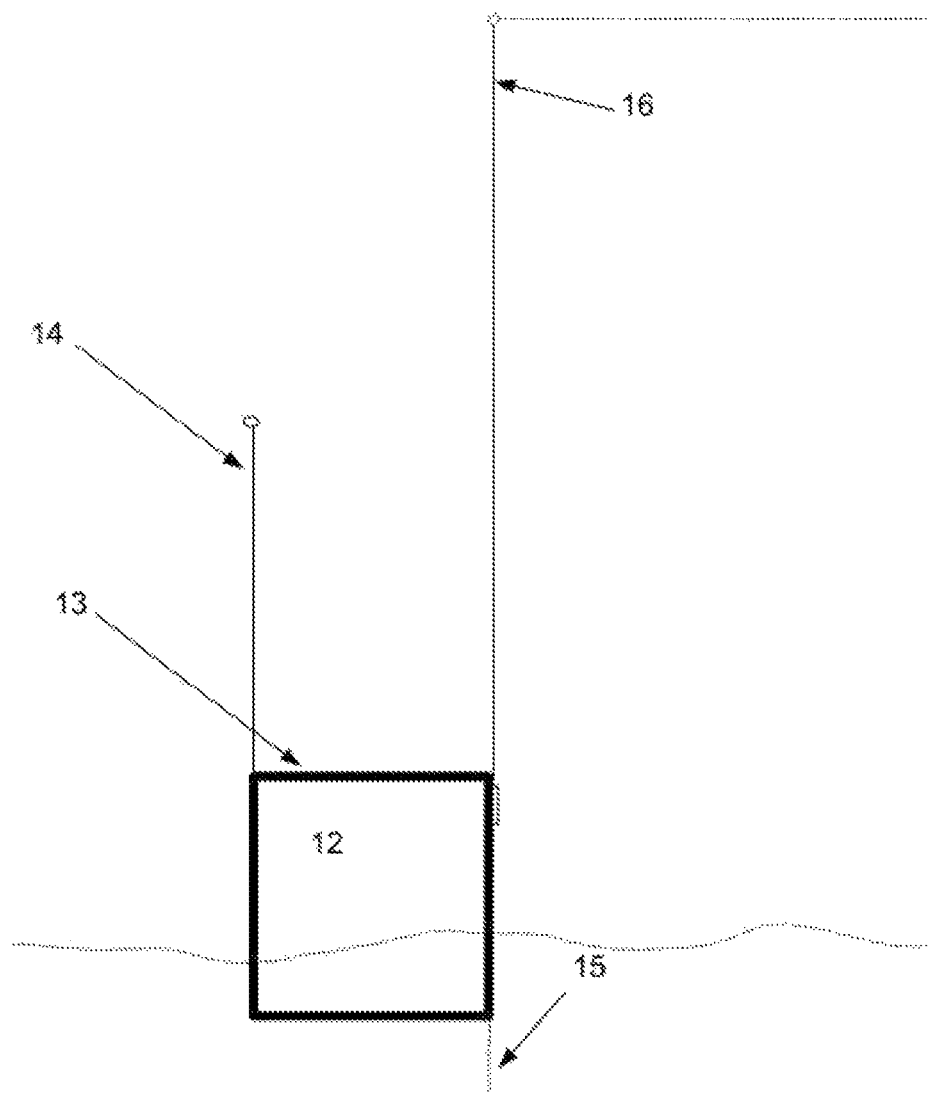

FIG. 6 shows the cross section of a rectangular version of the framework 12. Here, it is also possible to see indications of both the suspension and the height adjustment of the net-pen bag 15 being anchored here, and of the superstructure (16) being anchored there as well. The superstructure is necessary to ensure that high waves will not enable escape from one pen into another or away from the net-pen vessel as a whole. The framework may be equipped with antislip elements 13 on the walkway and railings 14.

Figure 1:
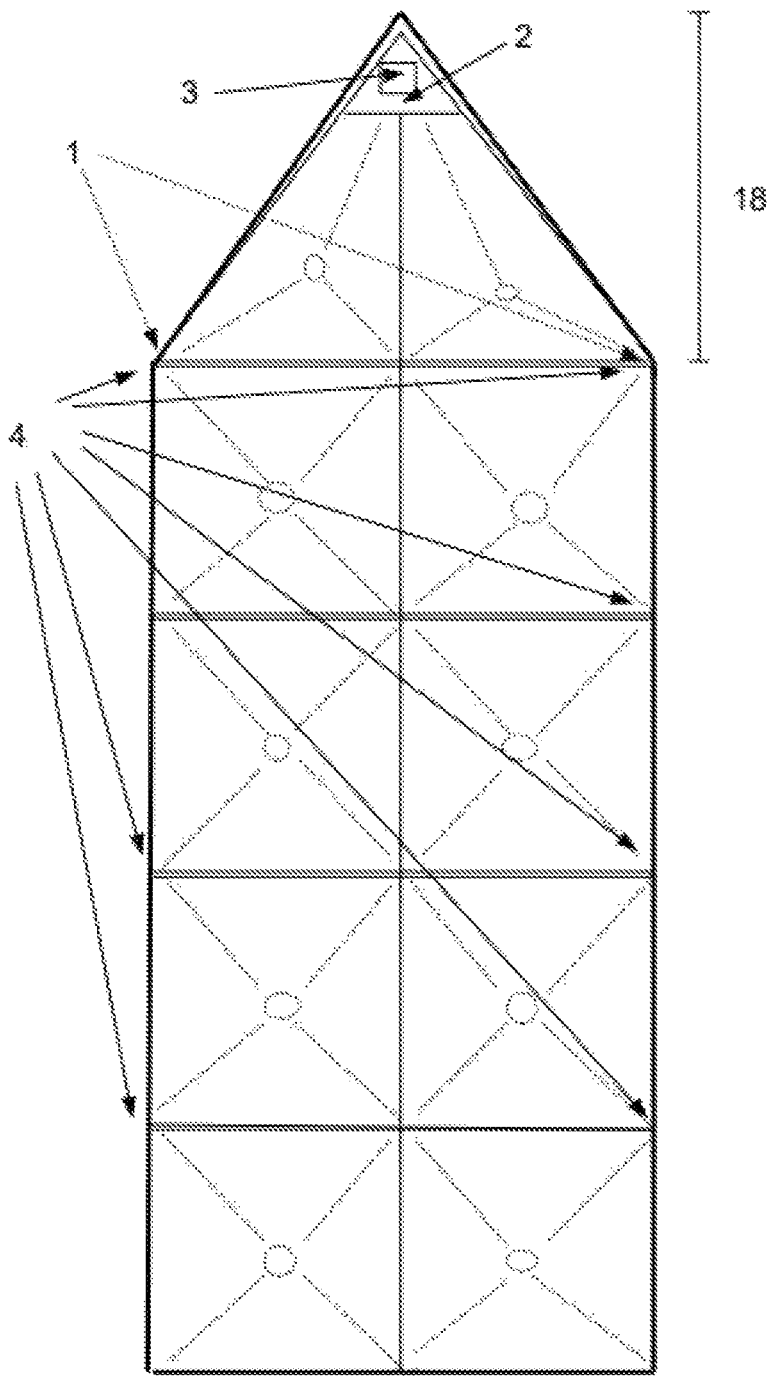
Figure 2:
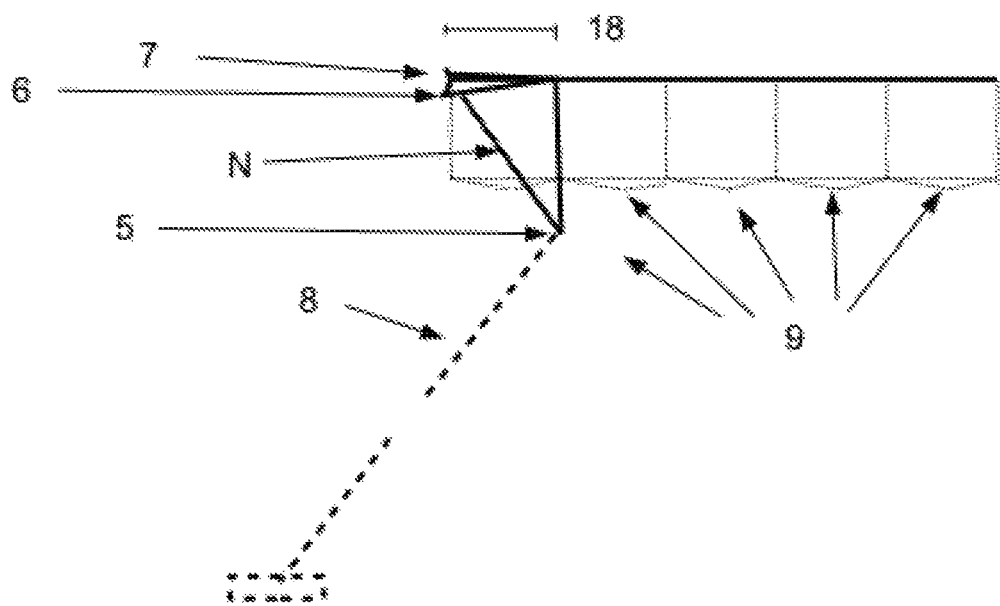
Figure 3:
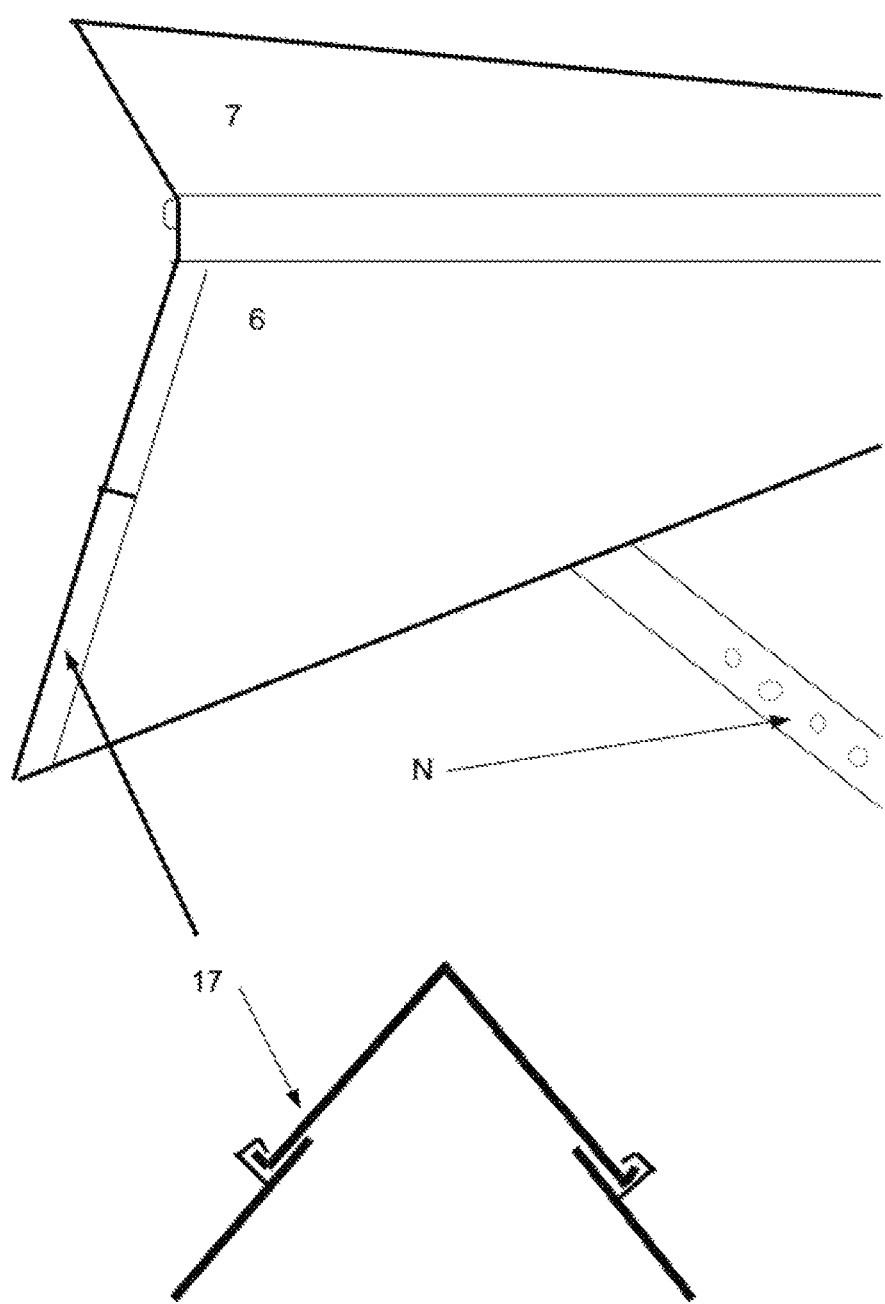
FIG. 3 shows the front part of the bow segment in more detail. An indication of a slide version of the possible adjustable passive propulsion 17 can be seen here.
Figure 4:
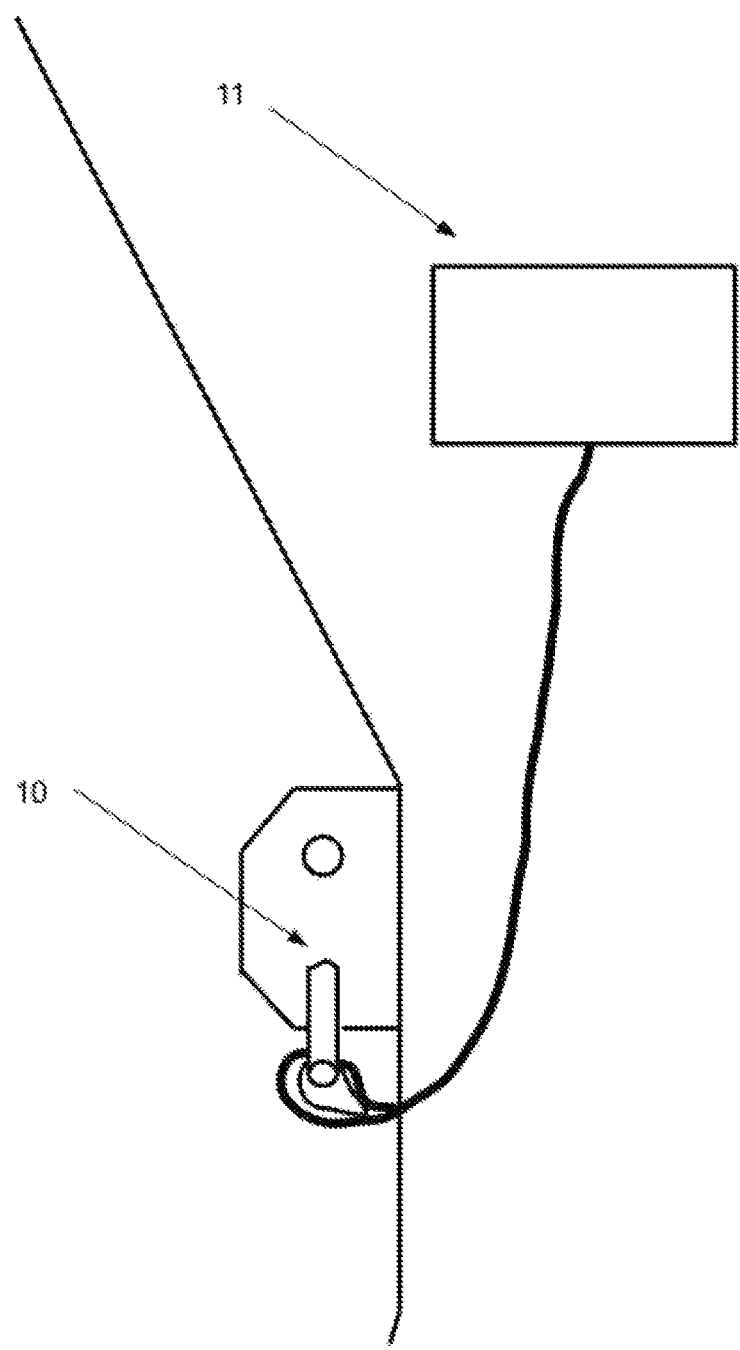
FIG. 4 shows a version of a towing hook 10 at the front part of the frame of the bow segment. It is also indicated that a safety measure with a drift anchor 11 may be positioned here.
Figure 5:
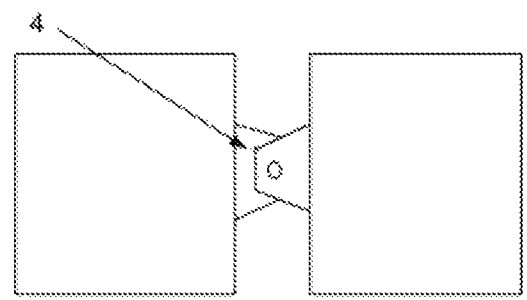
FIG. 5 shows a version of the joints 4 between the frames. These are what enables each segment to move to some extent relative to the others, and thus make the netpen vessel follow the wave movements of the sea to a great extent.
Figure 5:
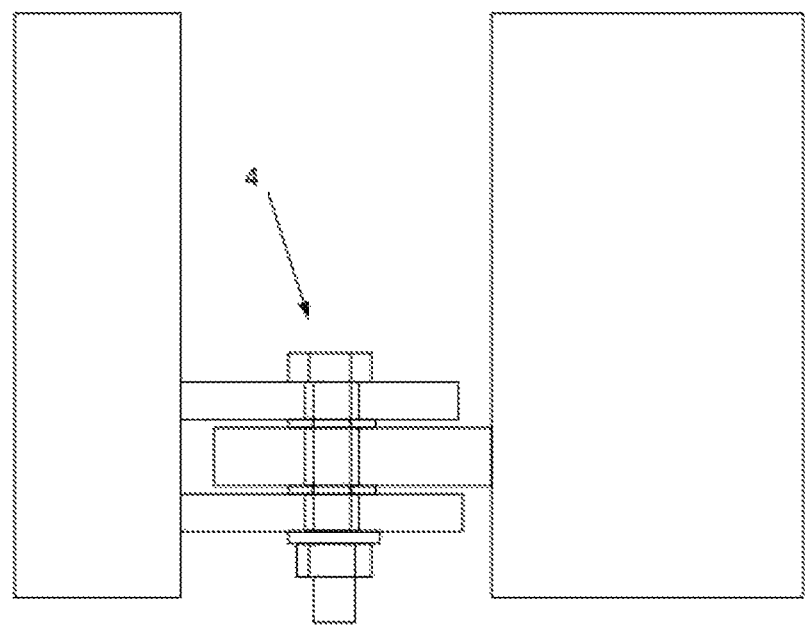

A segmented vessel consisting of a self-supporting floating framework 12 which functions as a walkway 13 and a foundation for both net pens 15 and superstructures 16. The fore segment (FIG. 3) functions as a bow with a high windshield 7.

The bow segment 18 has a structural member below the waterline, to which the anchoring is attached. In this example, the structural member comprises an oblique rod N forming a first end portion and a second end portion, the first end portion being fixed to the bow at the attachment point 2, and the second end portion being fixed to the junction 5. In this example, the anchor attachment is adjustable up along the oblique rod N of the structural member. In this example, the structural member consists of three rods that meet at the junction.

The fact that the anchor point for the anchoring/mooring 8 is located behind and lower than the balance point of the structure brings about a tipping motion because of the torque (force times length of lever arm) that this represents. This tipping motion makes the front part of the bow lift when the forces of the waves are large or the structure is moving up a wave, and the fact that the torque force ceases when the crest of the wave has been passed, brings the front part of the bow to be lowered when the structure is moving down a wave. This, in turn, makes the vessel to which the structure/bow part is articulatedly connected be spared more than with structures known so far when the wave forces are large or the vessel is moving up a wave. The fact that the anchoring/mooring 8 is attached behind and lower than the balance point of the structure requires it to be connected to at least one segment in order to orient up against the forces of the waves. Without one or more segments behind it, the wave forces will automatically turn the structure the wrong way round, and it will completely lose its seaworthiness.

The bow segment may have a skirt 6 that is larger than the windshield 7. The skirt may have a passive adjustable propelling function 17 that increases in higher waves.

The vessel is anchored 8 to the seabed and is swinging at anchor.

Such a vessel may be used as an acclimatization pen, a waiting pen, a delousing pen, a quarantine pen, a farming pen et cetera for fish and other aquatic organisms.

A net-pen vessel comprising at least one segment. The net-pen vessel is anchored to the seabed and lies out on the open sea. The net-pen vessel consists of segments. When there are several segments, the segments will be interconnected in such a way that it enables the net-pen vessel to adjust to the wave motions, and thereby be less prone to damage therefrom. Each segment may contain one or more net pens and consists of a framework which functions both as a walkway, a floating element and anchoring for everything on the net-pen vessel. The bow is connected to the anchoring via a structural member. The structural member may have a front oblique rod. In this example, the front oblique rod of the structural member is provided with several holes in the longitudinal direction, between which the anchor attachment for the anchoring may be moved, depending on how large a tipping deflection should desirably be achieved in the waves. When a wave lifts the bow segment, the front part will lift because of the anchoring to the seabed, and when the wave decreases, the shape of the skirt will make it pull the net-pen vessel forwards when the bow is moving down into the water masses again. In addition to being a passive propulsion system, the skirt also functions as a protection of the net pens against both wave forces and flotsam.

The effect of the skirt may be adjusted with an adjustable device as wave heights and wind conditions vary from place to place and season to season. The effect is adjusted by the ability of the skirt to catch the water masses being determined by how large an opening is chosen for the skirt.

The net-pen vessel may have a control room 3. On the roof of the control room 3, solar-cell panels (photovoltaic elements) may be placed to charge batteries.

The harvesting and processing of the fish in the net-pen vessel is dependent on an external vessel.

The invention claimed is:

1. A tipping bow comprising at least one articulated connection to a vessel behind and being connected to an anchoring, wherein the tipping bow has a structural member which is attached, to one or more attachment points, at the bottom edge of the tipping bow, wherein the anchoring is attached to an anchor attachment positioned behind and lower than the balance point of the tipping bow, and wherein the anchor attachment is attached to the structural member.

2. The tipping bow according to claim 1, further comprising a front oblique rod in the structural member between a front attachment point and a junction, wherein the anchor attachment is displaceable along the front oblique rod.

3. The tipping bow according to claim 1, further comprising a hull, the hull being formed as a skirt, wherein the skirt slopes forwards.

4. The tipping bow according to claim 1, wherein the vessel is configured for use as an acclimatization pen, a waiting pen, a delousing pen, a quarantine pen and a farming pen for fish and other aquatic organisms, or as a storage space or a living section for a crew.

* * * * *